(12) United States Patent
     Loeffelmann et al.

(10) Patent No.:     US 12,692,931 B2
(45) Date of Patent:          Jul. 28, 2026

(54) WET-RUNNING BEVEL GEAR DIFFERENTIAL FOR AN ELECTRICALLY OPERABLE AXLE DRIVE TRAIN

(71) Applicant: Schaeffler Technologies AG & Co. KG, Herzogenaurach (DE)

(72) Inventors: Jochen Loeffelmann, Eggolsheim (DE); Peter Welker, Herzogenaurach (DE); Andreas Rosenwald, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/840,492

(22) PCT Filed: Feb. 13, 2023

(86) PCT No.: PCT/DE2023/100113
     § 371 (c)(1),
     (2) Date: Aug. 22, 2024

(87) PCT Pub. No.: WO2023/160751
     PCT Pub. Date: Aug. 31, 2023

(65)          Prior Publication Data
     US 2025/0164000 A1       May 22, 2025

(30)     Foreign Application Priority Data
     Feb. 25, 2022   (DE) ..................... 10 2022 104 518.8
     Feb. 8, 2023    (DE) ..................... 10 2023 102 993.2

(51) Int. Cl.
     F16H 48/08          (2006.01)
     F16H 48/40          (2012.01)
     F16H 57/04          (2010.01)

(52) U.S. Cl.
     CPC ............. F16H 48/08 (2013.01); F16H 48/40 (2013.01); F16H 57/0427 (2013.01)

(58) Field of Classification Search
     CPC ....... F16H 48/08; F16H 48/40; F16H 57/0427
     See application file for complete search history.

(56)          References Cited

U.S. PATENT DOCUMENTS 7,229,376 B1      6/2007  Irwin
     2005/0164821 A1*  7/2005  Santelli ................... F16H 48/08
                                                           475/231

(Continued)

FOREIGN PATENT DOCUMENTS

CN        110529578 A      12/2019
     CN        217583075 U      10/2022

(Continued)

OTHER PUBLICATIONS

Authors: Erik Schneider, Frank Fickl, Bernd Cebulski and Jens Liebold, Title: Highly Integrative and Flexible Electric Drive Unit for E-Vehicles, Source: the German automotive magazine ATZ, vol. 113, May 2011, pp. 10-14.

(Continued)

*Primary Examiner* — Tinh T Dang

(57)          ABSTRACT

A bevel gear differential includes an axis of rotation, a first differential cage having an oil opening, a second differential cage connected to the first differential cage at a first connecting region, a differential gear, first and second output gears, and a cap. The first and second differential cages are driveable to rotate about the axis of rotation. The first output gear is rotatable about the axis of rotation and meshed with the differential gear, and the second output gear is aligned with the first output gear, rotatable about the axis of rotation, and meshed with the differential gear. The cap is axially open on both axial sides. The cap surrounds the first differential cage to cover the oil opening at a distance so that a (Continued)

filling level of an oil within the first differential cage and the second differential cage is maintained during operation of the bevel gear differential.

17 Claims, 3 Drawing Sheets

(56)                    References Cited

U.S. PATENT DOCUMENTS

2017/0102065  A1       4/2017  Ohmura
2021/0388892  A1*   12/2021  Oda ........................ F16H 48/40

FOREIGN PATENT DOCUMENTS

CN          118382769  A        7/2024
DE       102010048837  A1       4/2012
DE       102018124491  A1       4/2020
EP            1472475  B1      10/2005
EP            3309429  A1       4/2018

OTHER PUBLICATIONS

Office action Corresponding to Korean Patent Application No. 10-2024-7029281, dated Mar. 12, 2026.

* cited by examiner

WET-RUNNING BEVEL GEAR DIFFERENTIAL FOR AN ELECTRICALLY OPERABLE AXLE DRIVE TRAIN

CROSS-REFERENCE TO RELATED APPLICATIONS

This application is the United States National Phase of PCT Appln. No. PCT/DE2023/100113 filed Feb. 13, 2023, which claims priority to German Application Nos. DE102022104518.8 filed Feb. 25, 2022 and DE102023102993.2 filed Feb. 8, 2023, the entire disclosures of which are incorporated by reference herein.

TECHNICAL FIELD

The present disclosure relates to a wet-running bevel gear differential, e.g., for an electrically operable axle drive train of a motor vehicle, wherein an oil feed is realized between the differential cage of the bevel gear differential and a further component.

BACKGROUND

Electric motors are increasingly being used to drive motor vehicles in order to create alternatives to internal combustion engines that require fossil fuels. Significant efforts have already been made to improve the suitability of electric drives for everyday use and also to be able to offer users the driving comfort they are accustomed to.

A detailed description of an electric drive can be found in an article in the German automotive magazine ATZ, volume 113, 05/2011, pages 10-14 by Erik Schneider, Frank Fickl, Bernd Cebulski and Jens Liebold with the title: "Hochintegrativ und flexibel—Elektrische Antriebseinheit für E-Fahrzeuge" [Highly Integrative and Flexible—Electric Drive Unit for Electric Vehicles]. This article describes a drive unit for an axle of a vehicle, which includes an electric motor that is arranged to be concentric and coaxial with a bevel gear differential. A shiftable 2-speed planetary gear set is arranged in the power train between the electric motor and the bevel gear differential and is also positioned to be coaxial with the electric motor or the bevel gear differential or spur gear differential. The drive unit is compact and allows for a good compromise between climbing ability, acceleration and energy consumption due to the shiftable 2-speed planetary gear set. Such drive units are also referred to as e-axles or electrically operable drive trains/axle drive trains.

DE 10 2010 048 837 A1 discloses such a drive device having at least one electric motor and at least one planetary differential that can be driven by a rotor of the electric motor. The planetary differential has at least one planetary carrier that is operatively connected to a rotor of the electric motor, first planetary gears and second planetary gears, which are rotatably mounted on the planetary carrier, and a first sun gear and a second sun gear, each of which is operatively connected to an output shaft of the planetary differential. The first planetary gears mesh with the first sun gear and each of the second planetary gears meshes with the second sun gear and with one of the first planetary gears. Furthermore, the sun gears are arranged coaxially with an axis of rotation of the rotor.

A bevel gear differential is further known from the publication EP 1 472 475 B1, which can also be used in e-axles, for example. The bevel gear differential includes a differential housing, which can be driven via a ring gear firmly connected to the housing, as well as differential gears, which are rotatably mounted in the differential housing, and additionally two planetary gears, which are also rotatably mounted in the differential housing, with which the differential gears mesh and in this way form the outputs of the bevel gear differential.

In the development of electric machines and transmissions intended for e-axles, there is a continuing need to increase their power densities, so that the cooling required for this, e.g., of the electric machines and transmissions, is becoming increasingly important. Owing to the necessary cooling capacities, hydraulic fluids such as cooling oils have become established in most concepts for the removal of heat from the thermally loaded regions of an electric machine and/or transmission.

SUMMARY

The present disclosure provides a wet-running bevel gear differential, e.g., for an electrically operable axle drive train of a motor vehicle, having a first differential cage which is connected via a connecting region to a second differential cage for conjoint rotation therewith. The two interconnected differential cages accommodate two output gears which are aligned with one another and both mesh with at least one differential gear, and the two interconnected differential cages can be driven together so as to rotate about the axis of rotation of the output gears which are aligned with one another. At least one of the differential cages is surrounded by a cap that is axially open on both sides and covers an oil opening of the differential cage at a distance, so that a filling level within the differential cages is ensured during operation of the bevel gear differential.

The cap is spaced apart from the (oil) opening in the form of a gap-shaped intermediate space between the differential cage and the cap itself so that oil can be guided into the differential cage through the opening via this intermediate space. However, this cap also surrounds the differential cage around a circumference, so that in rotary operation of the bevel gear differential, an oil level is created on the inner peripheral surface of the cap, which flows through the opening and also creates an oil level within the bevel gear differential. By means of this surrounding, the cap covers the opening or encases the differential cage.

This is achieved, for example, by the congruent shape between the cap and the differential cage, which is surrounded by the cap. A differential cage of a bevel gear differential may be designed to be bell-shaped. Its outer peripheral surface is shaped in the manner of a bowl. The matching cap also essentially has the shape of a bowl, i.e., a shape congruent to that of the differential cage. In this manner, this cap surrounds the differential cage. In order to enable the cap to be mounted on the differential cage, on the one hand, it has a circular, central opening at one axial end. The other axial end also has a circular, central opening so that an output shaft projecting out of the differential cage can project through this opening.

A gap is formed radially between the cap and the differential cage, which can guide oil from one axial end of the cap to the opening of the differential cage. This oil-introducing axial end of the cap has a smaller inner diameter than the other, opposite axial end of the cap. The opening of the differential cage may be located in the region of the other axial end of the cap, and thus, due to the bell-shaped design, at a greater radial level to the axis of rotation than the circumferential edge of the oil-introducing end of the cap. The other end is attached in an oil-tight manner to the differential cage or a drive gear of the bevel gear differential.

In this manner, a trough shape is formed in the cross-section, which is able to build up an oil level in rotary operation, and the oil in the bevel gear differential collects in this trough base due to the centrifugal force.

The oil from the intermediate space of the cap and the differential cage enters into the inside of the differential cage via the at least one opening. The cap guides the oil from, for example, a tapered roller bearing, which supports the differential cage relative to the transmission housing, to this point or points.

If the bevel gear differential is at a standstill, i.e., is not rotated, a residual oil level forms on the geodesic lower part of the cap due to the force of gravity acting on the oil.

If the bevel gear differential starts to rotate, this residual oil level is dissolved, on the one hand, and the residual oil is distributed in the bevel gear differential—the residual oil is swirled. Fresh oil is fed in operation via the intermediate space between the cap and the differential cage. Excessive oil in the bevel gear differential will leak out over the edge of the oil-introducing end of the cap, entraining dirt from the bevel gear differential. The bevel gear differential can therefore be flushed according to the disclosure.

The bevel gear differential and its accommodated gears are therefore reliably supplied with oil. As a result, improved lubrication or cooling of the bevel gear differential can be achieved. Furthermore, the bevel gear differential is protected against external mechanical influences and contamination.

As the inside of the bevel gear differential is supplied with oil, the bevel gear differential is a wet-running bevel gear differential, which swirls the oil inside the differential cages during operation in such a way that the differential and output gears are sufficiently lubricated during operation.

Thus, according to the disclosure, a bevel gear differential is proposed which is suitable and/or designed for use in a vehicle. On the one hand, the bevel gear differential can be designed as a longitudinal differential, with which a drive torque can be distributed to two axles of the vehicle, or as a transverse differential or axle differential, wherein a drive torque is distributed to two output shafts of one and the same axle.

The bevel gear differential according to the disclosure can be used, for example, in an electrically operable axle drive train of a motor vehicle. An electric axle drive train of a motor vehicle includes an electric machine and a transmission arrangement. The transmission arrangement includes the bevel gear differential according to the disclosure.

Provision can, for example, be made for the electric machine and the transmission arrangement to be arranged in a common drive train housing. Alternatively, it would also be possible for the electric machine to have a motor housing and the transmission to have a transmission housing, and the structural unit can then be brought about by fixing the transmission arrangement relative to the electric machine. This structural unit is also known as an e-axle or electrically operable axle drive train.

The transmission arrangement of the electric axle drive train can, for example, be coupled to the electric machine, which is designed to generate a drive torque for the motor vehicle. The drive torque is a main drive torque, meaning that the vehicle is driven exclusively by the drive torque of the electric machine.

The at least one differential cage of the bevel gear differential may be designed to be bell-shaped. Both differential cages can have the same bell-shaped design, and both differential cages can also be identical. The bell-shaped design provides the differential cage with good structural stability, which also means that the oil can be guided through the intermediate space (gap) in a controlled manner in combination with the bell-shaped cap placed on the differential cage. The bell-shaped design of the cap may be congruent to the bell-shaped differential cage. The cap has a central opening at its two axial ends, with which, on the one hand, the cap can be plugged onto the differential cage and, on the other hand, the differential cage is not axially closed by the cap.

In one embodiment, the cap can have oil-guiding channels on its inner circumferential surface which introduce the oil from the oil-introducing axial end of the cap through the intermediate space into the opening of the differential cage.

According to one embodiment, oil entering from one end of the cap via channel openings formed there by the cap can be guided into the differential cage surrounded by the cap with the aid of the channels.

Alternatively or in addition, the differential cage, which carries the cap, can also have channels extending in the axial direction on its outer circumferential surface, the channel openings of which face the tapered roller bearing in each case.

According to a further embodiment, the at least one differential cage is rotatably mounted at one end via a tapered roller bearing relative to a connection structure of the transmission housing, and, in rotary operation of the bevel gear differential, the oil is introduced into the channel openings of the cap in the axial direction by the conveying effect generated by the rotation of the tapered roller bearing.

The channel openings (of the cap and/or the differential cage) may be located on the circumference of the pitch circle diameter. For example, this pitch circle diameter can be positioned with the pitch circle diameter of the tapered rollers of the tapered roller bearing, and a good oil supply from the bearing into the cap can be achieved.

Furthermore, according to an example embodiment, the cap can be connected for conjoint rotation to the differential cage at a connecting region with the differential cage surrounded by the cap. This means that there is no relative speed between the differential cage and the cap it carries.

According to a further embodiment, the connecting region can also include the connection for conjoint rotation of the two differential cages to one another. Prior to forming the connection, the gears arranged within the bevel gear differential can be pre-assembled and then the two differential cages can be connected to one another for conjoint rotation.

For the connection into the connecting region, the differential cage has a cylindrical ring-like attachment section extending coaxially to the axis of rotation of the differential cage.

In a further development, the cap is designed as a plastic injection-molded part. This allows the oil-guiding structures of the channels and channel openings to be produced in a simple and therefore economical manner.

In one embodiment, the channel openings widen the channels in a funnel-like manner in the circumferential direction. This allows oil to be efficiently captured in the channels when the cap rotates during operation.

In one embodiment, the channels of the cap are designed in a trough-like manner and thus form two axially extending and circumferentially opposite walls, and the channels also have an inner peripheral surface facing the axis of rotation for guiding the oil. Due to the centrifugal force acting on the oil during operation, the oil is placed on the inner peripheral surface, slides to the larger diameter end of the cap due to the bell-shaped design and is conveyed more quickly and accurately to the entry points of the differential cage, through which the oil reaches the gears, via the channels designed in a trough-like manner.

In one embodiment, the channels are delimited by the outer peripheral surface of the differential cage surrounded by the cap.

The present disclosure also includes an electrically operable axle drive train of a motor vehicle, having an electric machine and the bevel gear differential according to the disclosure coupled to the electric machine.

BRIEF DESCRIPTION OF THE DRAWINGS

The present disclosure is explained in more detail below with reference to drawings without limiting the general concept of the disclosure.

In the drawings.

DETAILED DESCRIPTION

Figure 1:
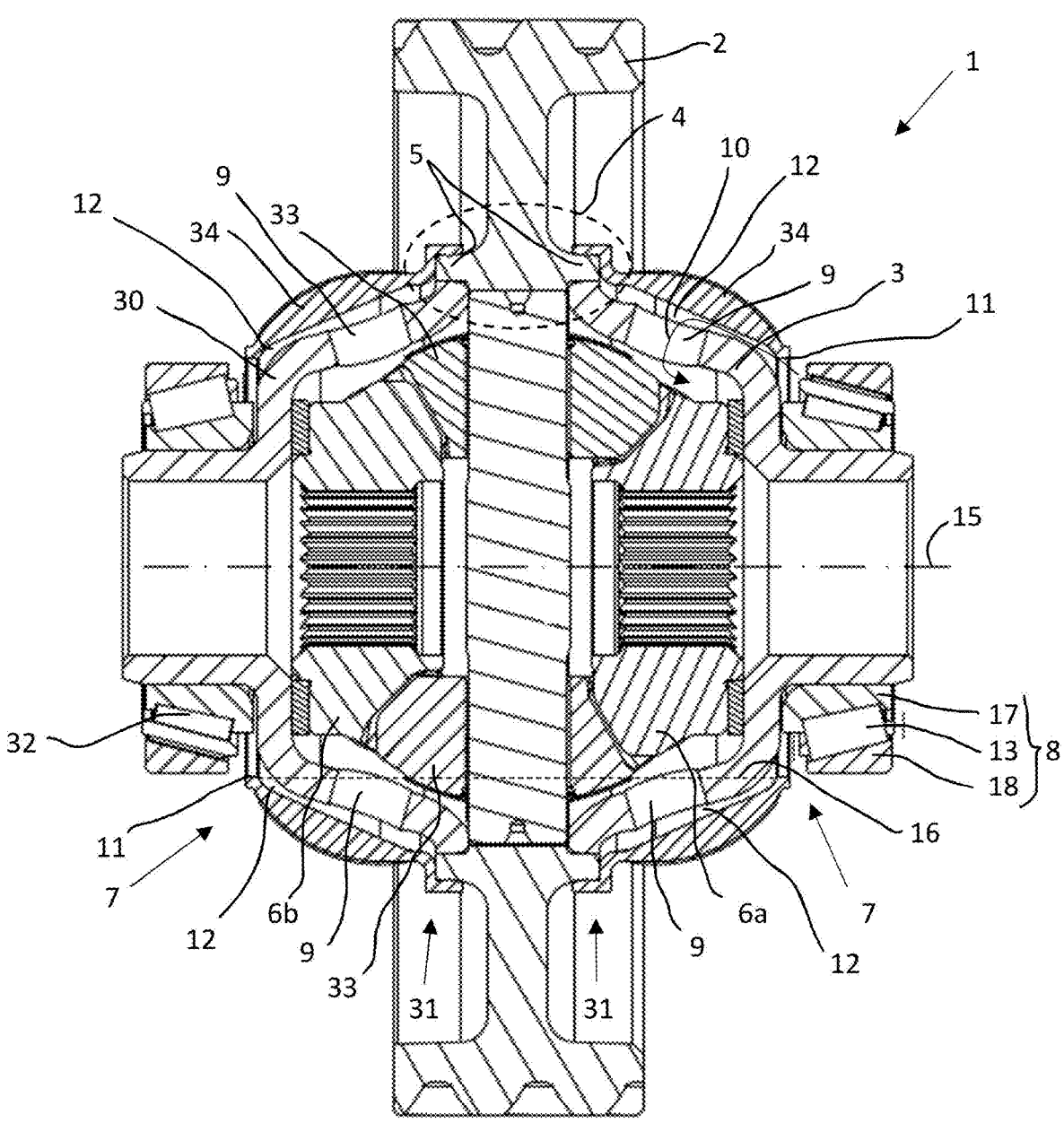
FIG. 1 shows a sectional view of a bevel gear differential according to the present disclosure.
Figure 3:
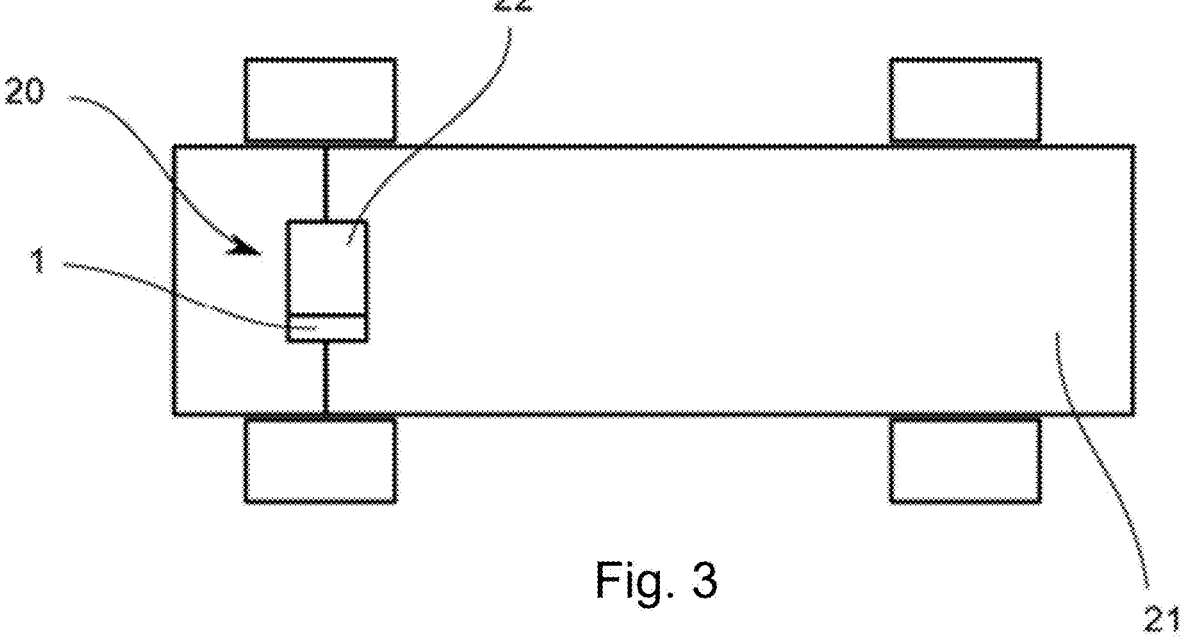
FIG. 3 shows a motor vehicle with an electrically operable axle drive train in a schematic block diagram view.

FIG. 1 shows a wet-running bevel gear differential 1 within an electrically operable axle drive train 20 of a motor vehicle 21, as also sketched in FIG. 3.

The bevel gear differential 1 has a drive gear 2 and a first and a second differential cage 3 and 30. The differential cage 3 is connected for conjoint rotation to the drive gear 2 and to the differential cage 30 via a connecting region 4 (dotted line). Within the bevel gear differential 1, the known and meshing differential gears 33 and output gears 6a, 6b are arranged.

The differential cage 3 can be filled with oil 10 at an end 7 facing away from the drive gear 2 via a tapered roller bearing 8, in which the oil is swirled by the rotation of the tapered roller bearing 8 during operation and introduced into the end 7 so that it reaches an intermediate space 12. The cap 34 sits on the outside of the differential cage 3 and is connected to the differential cage 3 for conjoint rotation. An intermediate space 12 exists between the cap 34 and the differential cage 3, which can guide the oil 10 in the axial direction to the opening 9. When the bevel gear differential 1 rotates during operation, the oil 10 is conveyed in the axial direction from the tapered roller bearing 8 through the remaining intermediate space 12 between the differential cage 3 and the cap 34 by the conveying effect generated by the rotation of the tapered roller bearing 8, which is indicated by the arrow. The oil-guiding intermediate space 12 between the cap 34 and the differential cage 3 can be formed by channels and channel openings.

The opening 9 can be formed several times distributed around the circumference by the differential cage 3 or 30. In order to define the oil level both in operation and at standstill, both differential cages 3 and 30 have such a cap 34. The cap 34 has a circumferential edge 11 at the oil-introducing end 7, which determines the filling level.

The cap 34 designed to be bell-shaped and axially open on both sides can have channels extending through it in the axial direction, and each channel can have a channel opening widening in a funnel-like manner which faces the tapered roller bearing 8. The channels open into openings 9 in the differential cage 3 on the differential cage side so that the oil 10 can reach the inside of the bevel gear differential 1. The bevel gear differential 1 is therefore a wet-running bevel gear differential.

Figure 2:
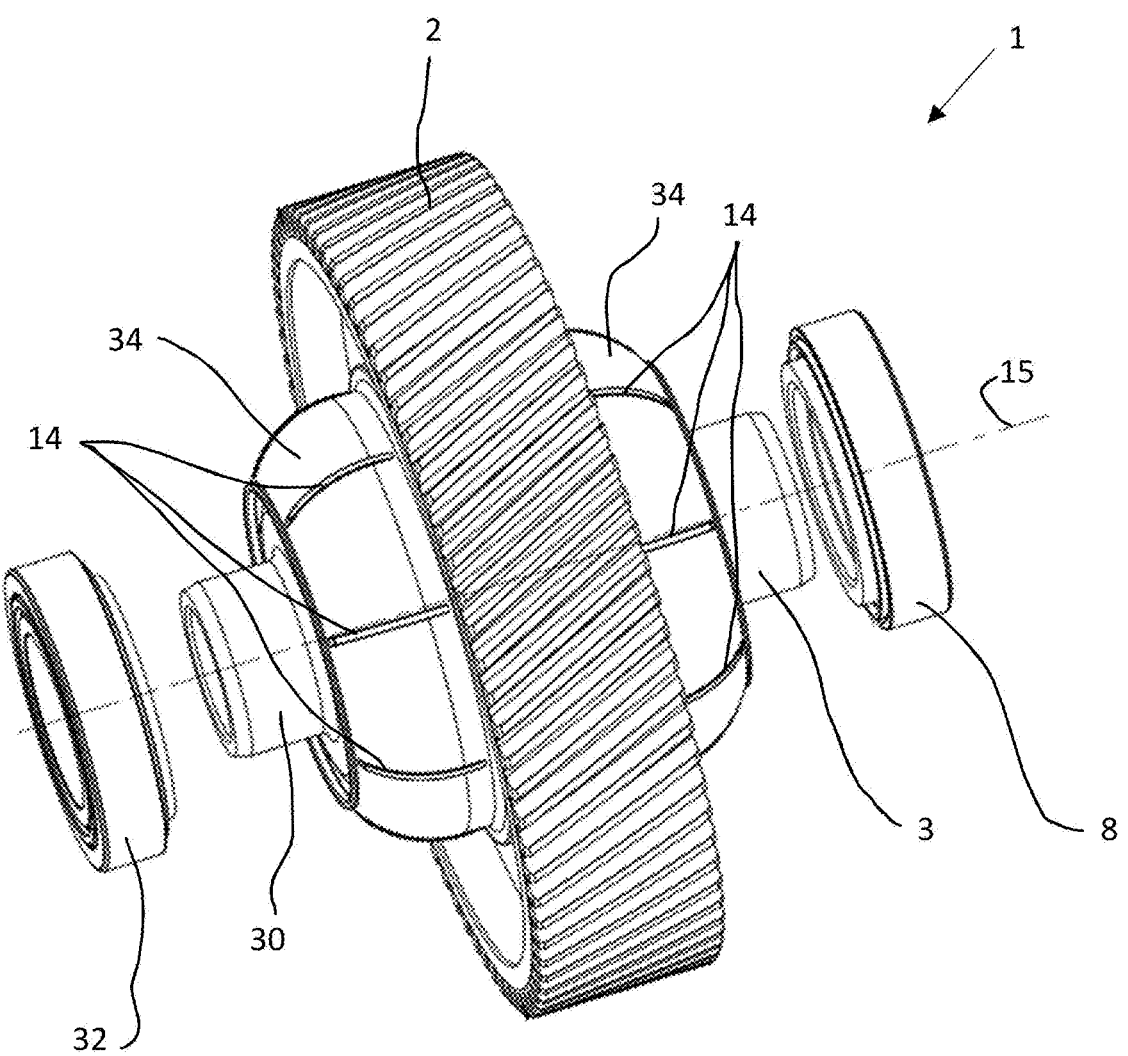
FIG. 2 shows an exploded perspective view of the bevel gear differential shown in FIG. 1.

As can be seen clearly in FIG. 2, the cap 34 has ribs 14 on its outer peripheral surface, which are distributed around its circumference and extend in the axial direction, for improved stability. The shown bevel gear differential 1, as can also be seen in FIG. 1, has a second differential cage 30, which is rotatably mounted at an end 7 facing away from the drive gear 2 via a second tapered roller bearing 32.

In the connecting region 5, the caps 34 are connected to the drive gear 2 for conjoint rotation. The two differential cages 3 and 30 are also connected to the drive gear 2 for conjoint rotation within the connecting region 5. This makes it clear that each cap 34, which surrounds its differential cage 3 or 30, is also connected to it indirectly via the drive gear 2 for conjoint rotation. The connection between the cap 34 and the drive gear 2 may be designed merely as a snap-fit connection so that the cap 34 cannot move axially relative to the differential cage 3 or 30. A snap-fit connection can be preloaded in such a way that a connection for conjoint rotation, as mentioned above, is also provided.

The intermediate space 12 guides the oil from outside the differential cage 3, 30 via the openings 9 into the inside of the differential cage 3, 30 and thus into the inside of the bevel gear differential 1. In this regard, the edge 11 ensures a filling level 16, which can be found by the dashed horizontal line in the lower half of the sectional view in FIG. 1. The filling level 16 is as shown when the bevel gear differential 1 is at a standstill. During operation (rotation) of the bevel gear differential 1, the oil is distributed around the circumference so that the filling level 16 is also found mirrored at the same radial distance from the axis of rotation 15 as determined by the edge 11. Obviously, the oil volume is greater during operation than at standstill. Excess oil during the change of state from operation to standstill can flow out via the edges 11 into the transmission chamber surrounded by a transmission housing, for example to a reservoir. During operation, the oil can be fed via an oil gallery to the tapered roller bearing 8, 32, which then transfers it to the oil-introducing end 7 of the cap 34 in the intermediate space 12.

The edge 11 has a larger diameter than the diameter of the outer ring 18 of the tapered roller bearing 8 or 32 (because both tapered roller bearings 8 and 32 may be identical parts). Since oil is supplied from the tapered roller bearing 8, 32 to the edge 11 of the cap 34, the diameter of the outer ring 18 refers to that which is functionally relevant for the oil supply.

As shown in FIG. 1, the diameter of the outer ring 18 can be found on the side facing the cap 34. The diameter is the inner diameter of the outer ring 18.

FIG. 3 shows an example application of the wet-running bevel gear differential 1 in an electrically operable axle drive train 20 of a motor vehicle 21, including an electric machine 22 and the bevel gear differential 1 coupled to the electric machine 22.

REFERENCE NUMERALS

1 Bevel gear differential
2 Drive gear
3 Differential cage
4 Connecting region
5 Receptacle
6a, 6b Output gear
7 End 8 Tapered roller bearing
9 Opening
10 Oil
11 Edge
12 Intermediate space
13 Tapered rollers
14 Rib
15 Axis of rotation
16 Filling level
17 Inner ring
18 Outer ring
20 Axle drive train
21 Motor vehicle
22 Electric machine
30 Differential cage
31 End
32 Tapered roller bearing
33 Differential gear
34 Cap

The invention claimed is:

1. A wet-running bevel gear differential, comprising:
a first differential cage which is connected via a first connecting region to a second differential cage for conjoint rotation therewith;
a drive gear, each of the first differential cage and the second differential cage connected to the drive gear via the first connecting region;
a plurality of caps, each of the plurality of caps rotatably connected to the drive gear via the first connecting region and each of the plurality of caps axially open on both sides;
wherein the first differential cage and the second differential cage accommodate two output gears which are aligned with one another and both mesh with at least one differential gear;
wherein the first differential cage and the second differential cage are can be driven together so as to rotate about an axis of rotation of the two output gears which are aligned with one another
wherein a first of the plurality of caps covers an oil opening of the first differential cage and a second of the plurality of caps covers an oil opening of the second differential cage at a distance so that a filling level of an oil within the first differential cage and the second differential cage is ensured during operation of the wet-running bevel gear differential.

2. The wet-running bevel gear differential of claim 1, wherein
oil entering from one end of the first of the plurality of caps is guided through a first intermediate space formed between the first of the plurality of caps and the first differential cage into first differential cage, and oil entering from one end of the second of the plurality of caps is guided through a second intermediate space formed between the second of the plurality of caps and the second differential cage into the second differential cage.

3. The wet-running bevel gear differential of claim 2, further comprising:
a first tapered roller bearing, the first differential cage is rotatably mounted at one end via the first tapered roller bearing;
a second tapered roller bearing, the second differential cage is rotatably mounted at one end via the second tapered roller bearing;
wherein, in rotary operation of the wet-running bevel gear differential, the oil is introduced into the first intermediate space in an axial direction by a conveying effect generated by the rotation of the first tapered roller bearing, and the oil is also introduced into the second intermediate space in the axial direction by a conveying effect generated by the rotation of the second tapered roller bearing.

4. The wet-running bevel gear differential of claim 1, further comprising:
a second connecting region, wherein the first of the plurality of caps is connected for conjoint rotation to the at least one of the first differential cage at the second connecting region, and the second of the plurality of caps is connected for conjoint rotation to the second differential cage at the second connecting region.

5. The wet-running bevel gear differential of claim 4, wherein
the second connecting region includes the first connecting region.

6. The wet-running bevel gear differential of claim 1, wherein
each of the plurality of caps is designed as a plastic injection-molded part.

7. The wet-running bevel gear differential of claim 1, wherein
the first of the plurality of caps and the first differential cage have a congruent shape.

8. The wet-running bevel gear differential of claim 1, wherein
the first of the plurality of caps has a circumferential edge at an oil-introducing end, which determines the filling level of the oil.

9. An electrically operable axle drive train of a motor vehicle, comprising an electric machine and the wet-running bevel gear differential of claim 1 coupled to the electric machine.

10. A bevel gear differential, comprising:
an axis of rotation;
a first differential cage comprising an oil opening;
a second differential cage comprising an oil opening, the second differential cage connected to the first differential cage at a first connecting region, the first differential cage and the second differential cage driveable to rotate about the axis of rotation;
a drive gear, each of the first differential cage and the second differential cage connected to the drive gear via the first connecting region;
a plurality of caps, each of the plurality of caps rotatably connected to the drive gear via the first connecting region;
a differential gear;
a first output gear rotatable about the axis of rotation and meshed with the differential gear;
a second output gear, aligned with the first output gear, rotatable about the axis of rotation, and meshed with the differential gear; and
wherein each of the plurality of caps axially open on both axial sides, a first of the plurality of caps and surrounding the first differential cage to cover the oil opening of the first differential cage and a second of the plurality of caps surrounding the second differential cage to cover of the oil opening of the second differential cage at a distance so that a filling level of an oil within the first differential cage and the second differential cage is maintained during operation of the bevel gear differential.

11. The bevel gear differential of claim 10, further comprising an intermediate space formed between the first differential cage and the first of the plurality of caps, wherein the oil entering the first of the plurality of caps from one axial side is guided through the intermediate space and into the first differential cage.

12. The bevel gear differential of claim 11 further comprising a tapered roller bearing, wherein:

the first differential cage comprises an end rotatably mounted on the tapered roller bearing; and a conveying effect generated by rotation of the tapered roller bearing introduces the oil into the intermediate space during rotary operation of the bevel gear differential.

13. The bevel gear differential of claim 12, wherein the first of the plurality of caps is connected to the first differential cage for conjoint rotation at a second connecting region.

14. The bevel gear differential of claim 13 wherein the second connecting region comprises the first connecting region.

15. The bevel gear differential of claim 10, wherein each of the plurality of caps is a plastic component formed by injection molding.

16. The bevel gear differential of claim 10, wherein the first of the plurality of caps and the first differential cage have a congruent shape.

17. The bevel gear differential of claim 10, each of the plurality of caps further comprising an oil-introducing end with a circumferential edge that determines the filling level.

\* \* \* \* \*